No. 838,666. PATENTED DEC. 18, 1906.
R. SYMMONDS.
POWER TRANSMISSION MECHANISM.
APPLICATION FILED APR. 9, 1904.
3 SHEETS—SHEET 3.
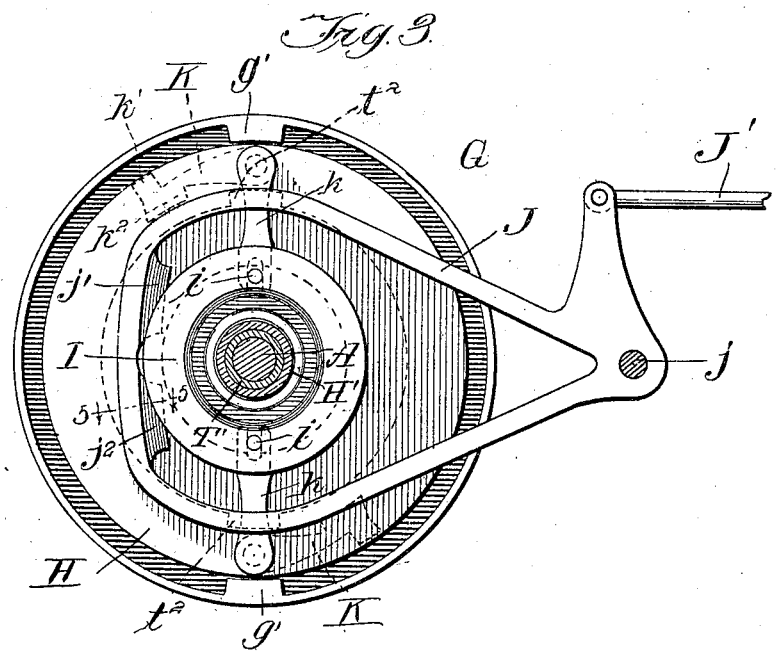
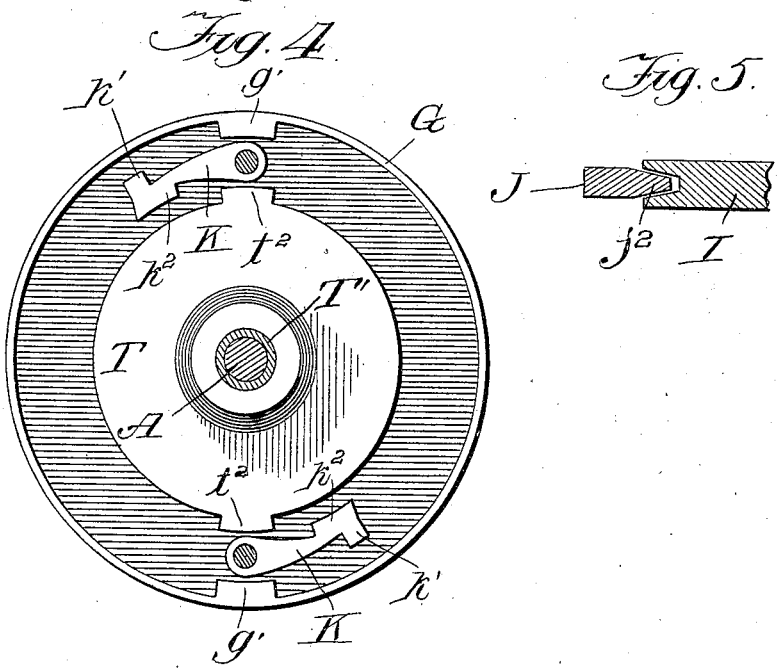
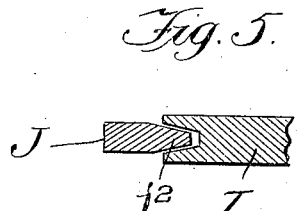

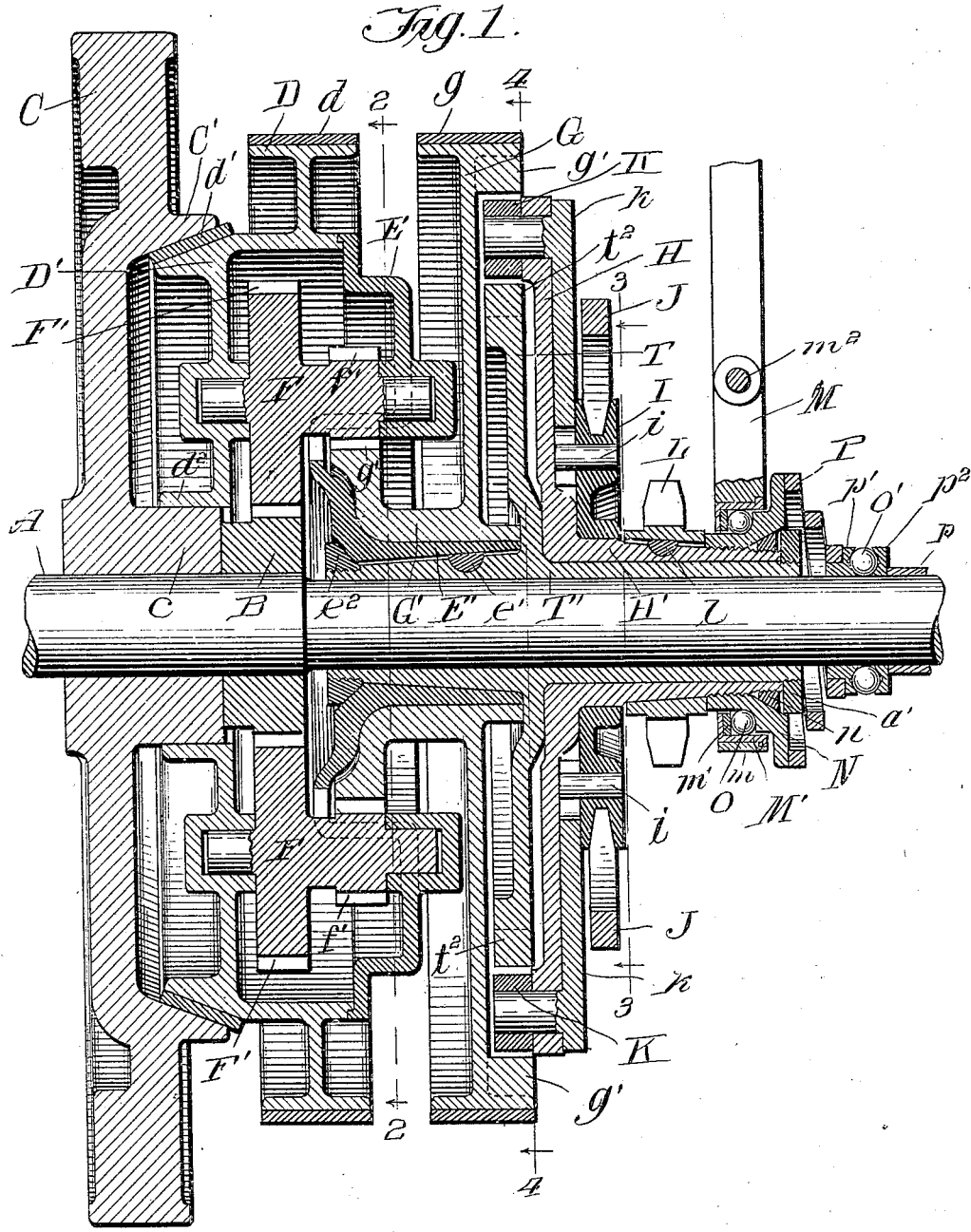

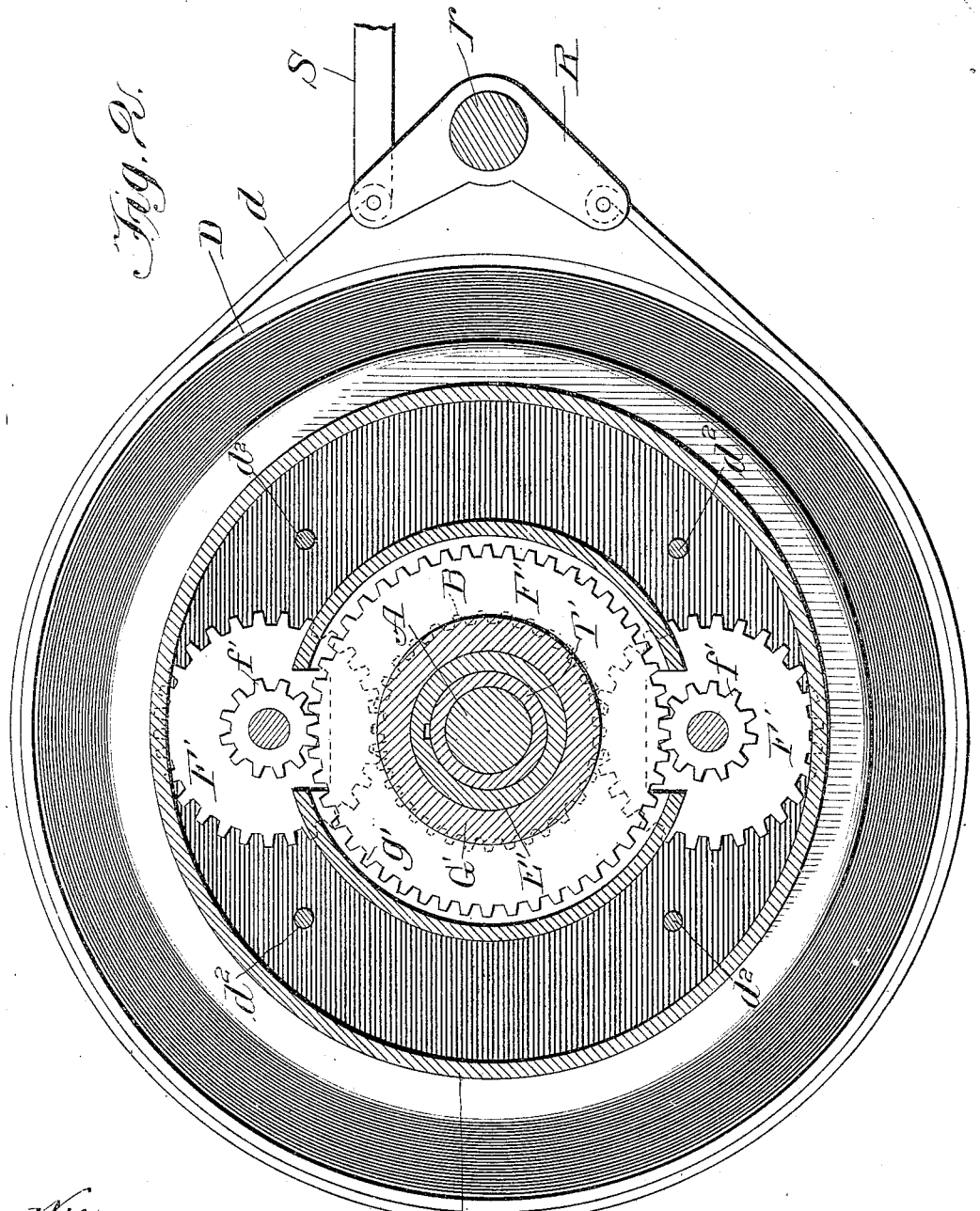

UNITED STATES PATENT OFFICE.

ROBERT SYMMONDS, OF KENOSHA, WISCONSIN, ASSIGNOR TO THOMAS B. JEFFERY, OF KENOSHA, WISCONSIN.

POWER-TRANSMISSION MECHANISM.

No. 838,666.  Specification of Letters Patent.  Patented Dec. 18, 1906.

Application filed April 9, 1904. Serial No. 202,470.

*To all whom it may concern:*

Be it known that I, ROBERT SYMMONDS, a citizen of the United States, residing at Kenosha, county of Kenosha, State of Wisconsin, have invented a certain new and useful Improvement in Power-Transmission Mechanism; and I declare the following to be a full, clear, and exact description of the invention, such as will enable others skilled in the art to which it pertains to make and use the same, reference being had to the accompanying drawings, which form a part of this specification.

My invention relates in general to power-transmission mechanism, and more particularly to differential gearing interposed between a motor and a driven element, whereby the latter may be rotated at various speeds in one direction or in a reverse direction.

It is desirable, especially in automobiles, to so connect the motor with a driven element, which in turn is operatively connected to the rear axle of the automobile, that the speed and power transmitted from the motor may be varied at the will of the operator and that the direction of rotation of the driven element may be reversed while the motor continues to run in the same direction.

The primary object of my invention is to provide transmission mechanism for connecting a motor to a driven element, which may be readily adjusted to inversely vary the speed and power of rotation of the element or to reverse the direction of rotation thereof.

A further object of my invention is to provide a differential transmission mechanism which will be simple in construction, inexpensive in manufacture, and efficient in operation.

My invention, generally described, consists in a shaft rotatively connected to a motor, a clutch member fixed upon the shaft, a second coöperating clutch member loosely surrounding the shaft, a sleeve loosely surrounding the driving-shaft, a radial disk interposed between and rigidly secured to said sleeve and the second clutch member, one or more stub-shafts, the ends of which are journaled in bearings formed in said disk and the second clutch member, a gear-wheel on said stub-shaft meshing with a gear-wheel fixed upon the driving-shaft, a pinion on said stub-shaft meshing with a gear-wheel carried by a second sleeve loosely surrounding the first sleeve, a disk carried by said second sleeve, having lugs extending inwardly from a circular flange around its periphery, a radial disk rigidly secured to the first sleeve and having outwardly-projecting lugs on its periphery, a third sleeve loosely surrounding the second sleeve and carrying pawls having inwardly and outwardly projecting lugs adapted to engage either the lugs on said flange or the lugs on said disk, a collar loosely surrounding said third sleeve and operatively connected to said pawls, a yoke surrounding said collar and adapted to frictionally engage and oscillate the same to actuate the pawls, a power-transmitting device carried by said third sleeve, and means for separately locking against rotation said second clutch member and the disk carried by the second sleeve.

My invention will be more fully described hereinafter with reference to the accompanying drawings, in which the same is illustrated as embodied in a convenient and practical form, and in which—

Figure 1 is a central sectional view; Fig. 2, a sectional view on line 2 2, Fig. 1; Fig. 3, a sectional view on line 3 3, Fig. 1; Fig. 4, a sectional view on line 4 4, Fig. 1, and Fig. 5, a detail sectional view on line 5 5, Fig. 3.

The same reference characters are used to designate the same parts in the several figures of the drawings.

Reference character A designates a driving-shaft, which is rotated by any suitable power connections—such, for instance, as a direct connection with the engine of an automobile.

B designates a gear-wheel fixed upon the shaft A adjacent to a fly-wheel C, also fixed upon the driving-shaft.

C' indicates a clutch member rigidly carried by the shaft A and preferably formed integral with the fly-wheel C. A coöperating clutch member D' concentrically surrounds the shaft A and is provided with a hub $d^2$, rotatively mounted upon the hub $c$ of the fly-wheel. The coöperating clutch members C' and D' are preferably provided with conical engaging surfaces, one of which is provided with a covering of leather or other suitable material to insure a tight engagement between the clutches.

The portion of the shaft A extending to the right in Fig. 1 from the gear B is preferably reduced and is loosely surrounded by a sleeve T'. A disk E surrounds the inner end of the sleeve T' and is rigidly secured thereto and is also rigidly united to the second clutch member D' by any suitable means—such, for instance, as bolts $d^2$. Any suitable means may be provided for rigidly securing the disk E to the sleeve T'—such, for instance, as a tubular extension E', formed integrally with the disk E and non-rotatively secured to the sleeve T' by means of a key $e'$. $e^2$ designates a lock-ring in screw-threaded engagement with the end of the sleeve T' and engaging the adjacent portion of the disk E to prevent the same from becoming disengaged from the sleeve T', which it surrounds.

The second clutch member and disk E serve as a carrier in the space between which are journaled one or more stub-shafts F, the opposite ends of which rotatively engage bearings formed in the opposing surfaces of the clutch member and disk. Each stub-shaft F is provided with a gear-wheel F', fixed thereon and preferably formed integral therewith, which meshes with the gear B. A pinion $f'$ is carried rigidly by each stub-shaft F and meshes with a gear-wheel $g'$, carried by a sleeve G', loosely surrounding the tubular portion E' of the disk E. A radial disk G is rigidly carried by the sleeve G' and is provided with a circular flange extending around its outer periphery.

$g'$ designates lugs projecting inwardly from the circular flange around the disk G.

T designates a radial disk fixed upon and preferably formed integral with the sleeve T'.

$t^2$ designates lugs projecting outwardly from the periphery of the disk T.

H' designates a third sleeve which loosely surrounds the portion of the sleeve T' to the right of the disk T in Fig. 1.

K designates pawls carried by a disk H, rigidly secured to the sleeve H'. The pawls K are interposed between the outer periphery of the disk T and the overlying portion of the flange around the disk G. Each pawl K is carried by a pin rotatively extending through the disk H, while inwardly-extending arms, having slotted lower ends, are rigidly secured to the pins upon which the pawls are secured. Each pawl K is provided with an outwardly-extending lug $k'$ and an inwardly-extending lug $k^2$, the former being adapted to engage the lugs $g'$ and the latter adapted to be engaged by the lugs $t^2$.

Loosely surrounding the sleeve H', adjacent to the disk H is a collar I, provided with a groove in its periphery. Pins $i$ are carried by the collar I and extend within the slots formed in the lower ends of the levers $k$, which carry the pawls K. A yoke J surrounds the collar I and is provided with inwardly-projecting wedges $j'$ and $j^2$, spaced apart by an intervening recess, as clearly shown in Fig. 3. The yoke J is fulcrumed upon a rod $j$ and may be oscillated upwardly or downwardly by a rod J', pivotally connected to an ear rigidly secured to the yoke.

L designates a sprocket-wheel or other power-transmission device which surrounds and is fixed upon the sleeve H'.

$l$ designates a key for locking the sprocket-wheel upon the sleeve H'.

N designates a disk concentrically surrounding the end of the sleeve H' and secured thereto by means of a screw-threaded engagement.

$n$ designates a locking-ring for retaining the disk N upon the end of the sleeve.

Located adjacent to and surrounding the hub of the disk N is a yoke $m$, to which is connected and preferably integrally formed therewith a lever M, fulcrumed upon a rod $m^2$. Located within the yoke $m$ is a lining of tough metal M', spaced apart from the disk N to form a raceway in which are located ball-bearings $o$.

$m'$ designates a washer of tough metal located within the inwardly-extending radial flange of the lining M' to assume the wear of the ball-bearings.

$a'$ designates a ring in screw-threaded engagement with the end of the sleeve T' to retain the sleeve H' thereon.

A collar $p^2$ surrounds the shaft A, near the right thereof in Fig. 1, and is prevented from moving axially toward the right by any suitable means—such, for instance, as a collar $p$, fixed upon the shaft. Interposed between the collar $p^2$ and a coöperating collar $p'$, loosely surrounding the shaft A, are ball-bearings $o'$. A spring P is interposed between the disk N and the collar $p'$, the tension of which forces the clutch member D' into engagement with the coöperating clutch member C'.

A clutch-band $g$ surrounds the circular flange carried at the periphery of the disk G, while a similar clutch-band $d$ surrounds a circular flange D, carried by the movable clutch member D'. Any suitable means may be provided for causing the clutch-bands $d$ and $g$ to tightly grip the circular flanges, which they surround, and thereby lock the second clutch member and the disk G against rotation. In Fig. 2 I have shown a bell-crank lever R, fulcrumed upon a rod $r$, to the arms of which the ends of the clutch-band $d$ are secured. S indicates a suitable connection for oscillating the bell-crank lever, and thereby tightening the clutch-band around the flange. Similar mechanism (not shown) may be provided for actuating the clutch-band $g$.

The operation of my invention is as follows: The shaft A is rotated through its connection with the motor, and with it rotates the fly-wheel C and gear-wheel B. When it is desired to rotate the sprocket-wheel L at the same speed at which the shaft A rotates, the lever M is so actuated as to permit the spring P to expand, thereby moving the sleeve T', and with it the disk E and clutch member D', toward the fly-wheel and forcing the clutch member D' into frictional engagement with the clutch member C'. The positions of the parts above described are shown in Fig. 1. The rod J' (see Fig. 3) is then actuated so as to rock the yoke J upwardly, which causes the wedge $j^2$ to engage within the groove in the periphery of the collar I and oscillate the latter about the sleeve H'. Such oscillation of the collar I through the engagement of the pins $i$, carried thereby, with the slotted ends of the levers $k$ swings inwardly the pawls K and projects the lugs $k^2$ thereon into the path of rotation of the lugs $t^2$, carried by the disk T. The rotary motion of the driving-shaft A is communicated to the sprocket-wheel L through the engaged clutch members, the disk E, fixed to the clutch member D', the sleeve T', fixed to the disk E, the disk T, fixed upon the sleeve T' to the lugs $t^2$, pawls K, disk H, carrying the pawls, and sleeve H', upon which the sprocket-wheel is fixed. When it is desired to rotate the driving mechanism, which is rotatively connected to the sprocket-wheel L at a slower speed than that at which the driving-shaft A rotates, the lever M is oscillated about its fulcrum $m^2$, so that the yoke $m$ is moved toward the right in Fig. 1, thereby through the interposed ball-bearings moving the disk N and compressing the spring P. Such movement of the lever M moves the sleeve T' about the shaft A and disengages the clutch member D' from the clutch member C'. The rod J' is so actuated as to swing the yoke J downwardly, causing the wedge $j'$ to engage the groove in the periphery of the collar I and oscillate the latter downwardly, thereby swinging the pawls outwardly and locating the lugs $k'$ thereon in the path of rotation of the lugs $g'$. The rotary motion of the shaft A is communicated to the sprocket-wheel L at a reduced speed by the following operation: The clutch-band $d$ is caused to tightly engage the circular flange D, which it surrounds, and prevent the rotation of the clutch member D', thereby holding the carrier of the stub-shafts F non-rotatively about the driving-shaft and permitting such stub-shafts to be rotated through engagement with the gear-wheel B, fixed on the driving-shaft, with the gear-wheels F', fixed upon the stub-shafts. The rotation of the stub-shafts through the engagement of the pinions $f''$ thereon with the gear-wheel $g'$ rotates the sleeve G' and disk G, carried thereby, in the direction in which the driving-shaft is rotated, but at a less speed, owing to the relative sizes of the interposed gear-wheels. The rotation of the disk G is communicated to the sprocket-wheel L through the interlocking of the lugs $g$ with the lugs $k'$ on the pawls K, which rotatively locks the sleeve H' to the disk G. When it is desired to rotate the driven mechanism connected to the sprocket-wheel L in a direction the reverse to that in which the shaft A is rotated, the clutch members are disengaged by actuating the lever M, and the disk G is held against rotation by causing the clutch-band $g$ to tightly engage the peripheral flange therewith. The pawls are then oscillated, so that the lugs $k^2$ thereon are moved inwardly into the path of movement of the lugs $t^2$. The sprocket-wheel is then rotated in a reverse direction in the following manner: The gear-wheel $g'$ being held immovable, the rotation of the stub-shafts by the gear B causes the stub-shaft carrier, consisting in the clutch member D' and disk E, to rotate in an opposite direction to the rotation of the shaft A, and as the sleeve T' is rigidly connected to the disk E such reverse rotation is communicated to the sprocket-wheel L through the engagement of the lugs $t^2$ on the disk T, carried by the sleeve T', with the lugs $k^2$ on the pawls.

It is obvious that the rod J' may be so connected with the means for tightening the clutch-bands $d$ and $g$ that one single operation will engage the lugs $k'$ on the pawls with the lugs $g'$ and at the same time cause the clutch-band $d$ to grip the flange D when slow speed is desired, and another single operation will so actuate the pawls as to cause the lugs $k^2$ thereon to engage the lugs $t^2$ and simultaneously cause the clutch-band $g$ to hold the disk G against rotation when reverse speed is desired.

From the foregoing description it will be observed that I have invented an improved transmission-gearing in which the driven element may be directly connected to the rotating power-shaft, in which the driven element may also be connected to the power-shaft through interposed speed-reducing gearing, and in which the driven element may be driven in a reverse direction to that of the rotating shaft, such different movements of the driven elements being easily effected by the means of a comparatively simple mechanical structure.

While I have described more or less precisely the details of construction, I do not wish to be understood as limiting myself thereto, as I contemplate changes in form, the proportion of parts, and the substitution of equivalents as circumstances may suggest or render expedient without departing from the spirit of my invention.

Having now fully described my invention, what I claim as new, and desire to secure by Letters Patent, is—

1. In a power-transmitting mechanism, the combination with a driving-shaft, of two concentric sleeves loosely surrounding said shaft, means interposed between said shaft and said sleeves for rotating the sleeves in opposite directions, a driven element, radial disks fixed on said sleeves having lugs projecting from their peripheries, a pawl carried by the driven element, and means for oscillating said pawl into engagement with the lugs on either of said disks.

2. In a power-transmitting mechanism, the combination with a driving-shaft, of a clutch member fixed thereon, a sleeve loosely surrounding said shaft, a coöperating clutch member carried by said sleeve, means for moving said sleeve axially upon the shaft and thereby engaging or disengaging said clutch members, a radial disk fixed upon said sleeve having outwardly-projecting lugs on its periphery, a second sleeve loosely surrounding said first sleeve and interposed between the disk thereon and the clutch member fixed thereto, a radial disk carried by said second sleeve and having inwardly-projecting peripheral lugs, mechanism interposed between the driving-shaft and each of said sleeves for rotating the same in opposite directions, a third sleeve loosely surrounding said first sleeve, pawls carried by said third sleeve adapted to be engaged and disengaged with the peripheral lugs on either of said disks.

3. In a power-transmitting mechanism, the combination with a driving element, of a clutch member fixed thereto, a coöperating movable clutch member, a rigidly-connected gear-wheel and pinion carried by the movable clutch member, a gear-wheel fixed to the driving element and meshing with the gear-wheel carried by the clutch member, a radial disk rigid with the movable clutch member, a gear-wheel in mesh with said pinion, a radial disk integral with said last-mentioned gear-wheel, a driven element, means connecting said driven element to either of said disks, and means for separately locking said movable clutch member and said second disk against rotation.

4. In a power-transmitting mechanism, the combination with a driving-shaft, of a clutch member fixed thereto, a coöperating clutch member, a sleeve loosely surrounding said shaft and rigidly connected to said movable clutch member, a rigidly-connected gear-wheel and pinion interposed between and carried by the movable clutch member and said sleeve, a gear-wheel fixed to said shaft in mesh with the gear-wheel carried by the clutch member, a radial disk rigid with said sleeve, a gear-wheel in mesh with said pinion, a radial disk rigid with said last-mentioned gear-wheel, a driven element, means for connecting said driven element to either of said disks, and means for separately locking said sleeves against rotation.

5. In a power-transmitting mechanism, the combination with a driving-shaft, of a clutch member fixed thereto, a coöperating clutch member, a sleeve loosely surrounding said shaft and rigidly connected to said movable clutch member, a rigidly-connected gear-wheel and pinion interposed between and carried by the movable clutch member and said sleeve, a gear-wheel fixed to said shaft in mesh with the gear-wheel carried by the clutch member, a radial disk rigid with said sleeve, a gear-wheel in mesh with said pinion, a radial disk rigid with said last-mentioned gear-wheel, a driven sleeve loosely surrounding said first sleeve, means connecting said driven sleeve with either of said disks, and means for separately locking said disks against rotation.

6. In a power-transmitting mechanism, the combination with a driving-shaft, of a clutch member fixed thereto, a coöperating clutch member, a sleeve loosely surrounding said shaft and rigidly connected to said movable clutch member, a rigidly-connected gear-wheel and pinion interposed between and carried by the movable clutch member and said sleeve, a gear-wheel fixed to said shaft in mesh with the gear-wheel carried by the clutch member, a radial disk rigid with said sleeve, a gear-wheel in mesh with said pinion, a radial disk rigid with said last-mentioned gear-wheel, a driven sleeve loosely surrounding said first sleeve, pawls carried by said driven sleeve, means for actuating said pawls to engage either of said disks, and means for separately locking said disks against rotation.

7. In a power-transmitting mechanism, the combination with a driving-shaft, of a clutch member fixed thereto, a coöperating clutch member, a sleeve loosely surrounding said shaft and rigidly connected to said movable clutch member, a rigidly-connected gear-wheel and pinion interposed between and carried by the movable clutch member and said sleeve, a gear-wheel fixed to said shaft in mesh with the gear-wheel carried by the clutch member, a radial disk rigid with said sleeve, a gear-wheel in mesh with said pinion, a radial disk rigid with said last-mentioned gear-wheel, a driven sleeve loosely surrounding said first sleeve, pawls carried by said driven sleeve, a collar loosely surrounding said driven sleeve operatively connected to said pawls, means for oscillating said collar around said driven sleeve and thereby engaging or disengaging said pawls with said disks, and means for separately locking said disks against rotation.

8. In a power-transmitting mechanism, the combination with a driving-shaft, of a clutch member fixed thereto, a coöperating clutch member, a sleeve loosely surrounding said shaft and rigidly connected to said movable clutch member, a rigidly-connected gear-wheel and pinion interposed between and carried by the movable clutch member and said sleeve, a gear-wheel fixed to said shaft in mesh with the gear-wheel carried by the clutch member, a radial disk rigid with said sleeve, a gear-wheel in mesh with said pinion, a radial disk rigid with said last-mentioned gear-wheel, a driven sleeve loosely surrounding said first sleeve, pawls carried by said driven sleeve, a collar loosely surrounding said driven sleeve operatively connected to said pawls, a yoke surrounding said collar but normally disengaged therefrom, means for moving said yoke to cause the same to frictionally engage and oscillate said collar thereby actuating the pawls to engage either of said disks, and means for separately locking said disks against rotation.

In testimony whereof I sign this specification in the presence of two witnesses.

ROBERT SYMMONDS.

Witnesses:
H. W. JEFFERY,
G. H. EDDY.